United States Patent
Krebs et al.

(10) Patent No.: US 10,138,951 B2
(45) Date of Patent: Nov. 27, 2018

(54) DUAL CLUTCH

(71) Applicant: Schaeffler Technologies AG & Co. KG, Herzogenaurach (DE)

(72) Inventors: Florian Krebs, Baden-Baden (DE); Olaf Werner, Buehl (DE); Nils Fischer, Neuberg (DE); René Daikeler, Buehlertal (DE); Philippe Schwederle, Strasbourg (FR); Thomas Janz, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 432 days.

(21) Appl. No.: 13/626,325

(22) Filed: Sep. 25, 2012

(65) Prior Publication Data

US 2013/0020167 A1    Jan. 24, 2013

Related U.S. Application Data

(63) Continuation of application No. PCT/DE2011/000278, filed on Mar. 16, 2011.

(30) Foreign Application Priority Data

Mar. 25, 2010   (DE) .......... 10 2010 012 864

(51) Int. Cl.
*F16D 21/06* (2006.01)
*F16F 15/134* (2006.01)
(Continued)

(52) U.S. Cl.
CPC ............. *F16D 21/06* (2013.01); *F16D 3/66* (2013.01); *F16D 13/646* (2013.01);
(Continued)

(58) Field of Classification Search
CPC ...... F16D 3/66; F16D 2013/703; F16D 21/06; F16D 2021/0669; F16D 2300/22; F16D 2300/26; F16F 15/134
(Continued)

(56) References Cited

U.S. PATENT DOCUMENTS 5,121,821 A  *  6/1992  Poorman et al. ............ 192/3.28
5,482,512 A  *  1/1996  Stevenson ....................... 475/5
(Continued)

FOREIGN PATENT DOCUMENTS

CN     1364985 A    8/2002
CN     1896560 A    1/2007
(Continued)

*Primary Examiner* — Richard M Lorence
(74) *Attorney, Agent, or Firm* — Brooks Kushman P.C.

(57) ABSTRACT

A dual clutch having a first clutch which has a first pressure plate that is movable axially relative to a first counterplate for coupling a first clutch disk that is connected to a first output shaft, a second clutch, which has a second pressure plate that is axially movable relative to a second counterplate for coupling a second clutch disk that is connected to a second output shaft, a torsional vibration damper situated in the direction of flux force between the input shaft and the first counterplate wherein the torsional vibration damper includes a dual mass flywheel with a bow spring running in the circumferential direction to transmit torque, where the flux of force is introducible radially on the outside from the input shaft to the first counterplate into the dual mass flywheel, and is dispersible radially on the inside to the bow spring.

12 Claims, 2 Drawing Sheets

(51) Int. Cl.
*F16D 13/70* (2006.01)
*F16D 3/66* (2006.01)
*F16D 13/64* (2006.01)

(52) U.S. Cl.
CPC ...... *F16F 15/134* (2013.01); *F16D 2013/703* (2013.01); *F16D 2021/0607* (2013.01); *F16D 2021/0669* (2013.01); *F16D 2300/22* (2013.01); *F16D 2300/26* (2013.01)

(58) Field of Classification Search
USPC ............ 192/48.603, 48.606, 48.608, 48.609, 192/48.607, 48.8, 85.53, 85.59, 55.61, 192/212, 48.9; 464/66.1–67.1
See application file for complete search history.

(56) References Cited

U.S. PATENT DOCUMENTS

| | | | |
|---|---|---|---|
| 5,617,940 A * | 4/1997 | Fukushima et al. | 192/70.17 |
| 5,789,823 A * | 8/1998 | Sherman | 290/47 |
| 2002/0060118 A1 * | 5/2002 | Beneton et al. | 192/48.8 |
| 2003/0079953 A1 | 5/2003 | Carlson et al. | |
| 2005/0139442 A1 * | 6/2005 | Agner et al. | 192/48.8 |
| 2011/0088989 A1 | 4/2011 | Agner | |

FOREIGN PATENT DOCUMENTS

| | | | |
|---|---|---|---|
| CN | 1955502 A | 5/2007 | |
| DE | 10013576 A1 | 9/2000 | |
| DE | 19953091 | 8/2001 | |
| DE | 10316445 | 10/2003 | |
| EP | 0931951 | 7/1999 | |
| EP | 1361102 | 11/2003 | |
| EP | 1524446 | 4/2005 | |
| EP | 1744074 | 1/2007 | |
| FR | 2791405 A1 * | 9/2000 | ............ F16D 21/06 |
| FR | 2851626 | 8/2004 | |
| GB | 2369416 A | 5/2002 | |
| WO | 2009152800 A1 | 12/2009 | |

* cited by examiner

DUAL CLUTCH

CROSS-REFERENCE TO RELATED APPLICATIONS

This application is filed under 35 U.S.C. § 120 and § 365(c) as a continuation of International Patent Application No. PCT/DE2011/000278 filed Mar. 16, 2011, which application claims priority of German Patent Application No. 10 2010 012 864.3 filed Mar. 25, 2010, which applications are incorporated herein by reference in their entireties.

FIELD OF THE INVENTION

The invention relates to a dual clutch, wherein an input shaft on the engine side can be coupled with two different output shafts arranged coaxially to each other on the transmission side, substantially free of interruptions in tensile force.

BACKGROUND OF THE INVENTION

A dual clutch having a first clutch and a second clutch is known from FR 2 851 626 A1 The clutches each have a pressure plate that is movable axially relative to a counterplate, between which a clutch disk can be coupled with frictional engagement. The respective clutch disk is connected to the respective output shaft so that it is rotationally fixed but axially movable. Situated between the input shaft and the first counterplate in the direction of flux of force is a torsional vibration damper, in which the flux of force is introduced radially on the outside and is dispersed radially on the outside to the first counterplate.

There is a longfelt need to simplify the construction of dual clutches without increasing the construction space significantly.

BRIEF SUMMARY OF THE INVENTION

The dual clutch according to the invention, for coupling an input shaft on the engine side with a first output shaft on the transmission side and/or a second output shaft on the transmission side, has a first clutch which has a first pressure plate that is movable axially relative to a first counterplate for coupling a first clutch disk that is connected to the first output shaft. Furthermore, the dual clutch has a second clutch, which has a second pressure plate that is axially movable relative to a second counterplate for coupling a second clutch disk that is connected to the second output shaft. In the direction of flux of force, a torsional vibration damper is situated between the input shaft and the first counterplate. According to the invention, the torsional vibration damper is designed as a dual mass flywheel with a bow spring running in the circumferential direction to transmit torque, where the flux of force is introducible radially on the outside from the input shaft to the first counterplate into the dual mass flywheel, and is dispersible radially on the inside to the bow spring.

In this configuration according to the invention, if the dual mass flywheel is additionally attached to clearly different outside and inside diameters, the attaching devices needed for this, for example screws or rivets, cannot impede each other. That prevents, for example, a screw and/or rivet head of the one attachment from being able to strike the screw and/or rivet head of the other attachment of the dual mass flywheel. That enables the spacing of the individual components to be reduced in the axial direction, which makes it possible to achieve a reduction of the construction space in the axial direction. Furthermore, additional design freedoms are created in the arrangement of the individual fastening devices in the circumferential direction. The maximum torsional angle of the input side of the dual mass flywheel relative to the output side of the dual mass flywheel is also no longer limited by a danger of collision of opposed fastening devices. To attach the counterplate with the dual mass flywheel, it is merely necessary to execute the radial extension of the counterplate with appropriate length radially toward the inside. This design configuration of the first counterplate can be implemented especially easily, and does not result in any significant increase in the complexity of the construction of the dual clutch. Instead, it is possible to design the dual mass flywheel more simply, as a flux of force from radially outside to radially inside and back to radially outside through the interposed bow springs (corresponding to the construction according to FR 2 851 626 A1) is not necessary. Instead it is sufficient to provide the flux of force from radially outside through the bow springs to radially inside, so that components that lead past the movable components of the dual mass flywheel are not necessary for the flux of force from radially inside to radially outside. This results in a simplified construction of the dual clutch, without significantly increasing the construction space.

The respective clutch disk can be connected to the respective output shaft by gearing so that it is rotationally fixed but axially movable. The first counterplate and/or the second counterplate, as a separate component, can be spaced radially inwardly from a radially outer housing wall. In particular, a cover connectible to the input shaft on the engine side through the dual mass flywheel according to the invention is provided, the cover being connected to the first counterplate and the second counterplate in rotationally fixed connections. It is also possible that the first counterplate or the second counterplate is formed from the cover and/or a component positioned axially opposite the cover, in particular in a single piece. For example, one of the counterplates can be formed by a flywheel connected to the input shaft on the engine side. The clutch disk can have a friction lining in particular on each of axial faces directed in particular away from each other, in order to bring about a frictionally engaged contact both with the counterplate and with the pressure plate when coupling. The respective clutch disk can be connected to the respective output shaft by gearing so that it is rotationally fixed but axially movable. The respective pressure plates and counterplates are designed in particular as separate functionally separated components, so that a so-called "four-plate design" is possible for the dual clutch without significantly increasing the construction space.

By particular preference, the dual mass flywheel has an input flange on the engine side to introduce the flux of force from the input shaft into the dual mass flywheel, the first counterplate being braced and supported on the input flange, in particular by means of a fixed bearing. The input flange can have, in particular radially on the inside, an extension that is opposed essentially axially in the direction of the first counterplate, which extends further in particular in the axial direction than an output flange of the dual mass flywheel which is connected to the first counterplate. Due to the opposing extension, this brings about a contact surface against which the first counterplate can be braced. The first counterplate can form a slide bearing with the input flange, or can be supported by means of a bearing situated between the first opposing plate and the input flange. As a result, it is not necessary to brace the first counterplate on one of the output shafts. In particular, it is possible to combine the dual mass flywheel together with the first counterplate into a common module, so that the dual mass flywheel together with the first counterplate can be installed in the dual clutch as a single pre-assembled module. To this end, it is necessary, for example, only to connect the first counterplate to a cover of the dual clutch. This makes it possible to avoid a connection and/or contact of the dual mass flywheel with the cover. Because of the modular construction of the dual clutch, the assembly of the dual clutch can be simplified and accelerated.

The invention also relates to a dual clutch for coupling an input shaft on the engine side with a first output shaft on the transmission side and/or a second output shaft on the transmission side, the dual clutch having a first clutch which has a first pressure plate that is movable axially relative to a first counterplate for coupling a first clutch disk that is connected to the first output shaft. The dual clutch also has a second clutch, which has a second pressure plate that is axially movable relative to a second counterplate for coupling a second clutch disk that is connected to the second output shaft. A torsional vibration damper is located in the direction of flux of force between the input shaft and the first opposing shaft. According to the invention, the torsional vibration damper is designed as a centrifugal force pendulum. By means of the centrifugal force pendulum, the construction of the dual clutch can be considerably simplified in comparison to a dual mass flywheel, without significantly increasing the required construction space. In particular, it is possible by means of the centrifugal force pendulum to avoid components that project radially inward, so that sufficient construction space remains between the friction linings of the clutches and the output shafts, which can be used for other purposes. In particular, it is possible for the first clutch disk and/or the second clutch disk to be connected to a plate damper, which is situated between the friction linings of the clutch disk and the output shaft. As a result, the dual clutch can dampen particular different frequencies. For example, the plate damper of the respective clutch can dampen the first main stimulus of the torsional vibration of the input shaft caused by the engine combustion, while the centrifugal force pendulum dampens the second main stimulus. This construction is especially attractive if the dual clutch is to be connected to a dual stroke gasoline engine, so that the natural frequency does not lie within the driving range. This reliably prevents critical torsional vibrations, which result in loud driving noise and impose a severe load on the components of the dual clutch.

In an especially preferred embodiment, the dual clutches according to the invention can have an actuating mechanism for moving the first pressure plate and/or the second pressure plate axially, the first pressure plate and/or the second pressure plate being coupled to the actuating mechanism essentially without a gear ratio change. Because of the simplified construction of the dual clutch and the additional construction space between the friction linings of the clutches and the output shafts created thereby, the friction linings can be lengthened radially toward the inside, so that the effective friction surface between the respective pressure plate and the respective clutch disk and between the respective counterplate and the respective clutch disk is enlarged correspondingly. As a result, it is possible in particular to design the dual clutch as a directly actuated dual clutch, so that an additional gear ratio change between the actuating mechanism and the pressure plate is not necessary. Under the theoretical assumption of a flexurally rigid connecting element between the actuating mechanism and the respective pressure plate, the travel distance of an actuating piston of the actuating mechanism corresponds essentially to the travel distance of the pressure plate. No swiveling of a connecting element provided between the actuating mechanism and the pressure plate takes place. The travel distance of the respective pressure plate thus differs from the actuating distance of the associated piston only by the travel distance in the axial direction by which the associated connecting element can be bent elastically when the respective clutch is operated.

By particular preference, the first pressure plate is connected to the actuating mechanism by means of a first actuating pot, and/or the second pressure plate is connected to the actuating mechanism by means of a second actuating pot, the first actuating pot and the second actuating pot being movable only axially. No swiveling of the respective actuating pot takes place, so that it is not necessary to have the corresponding components which would enable a swiveling of the respective actuating pot. Because there is no need for an additional gear ratio change when operating the respective pressure plate by means of the respective actuating pot, the construction of the dual clutch can be simplified significantly and the necessary construction space can even be reduced.

Preferably, the actuating mechanism has a first annular pressure cylinder to move the first pressure plate and a second annular pressure cylinder to move the second pressure plate, the first pressure cylinder and the second pressure cylinder being situated coaxially with respect to each other. The coaxial arrangement of the annular pressure cylinders results in an especially compact and construction-space-saving structure for the actuating mechanism.

In particular, the torsional vibration damper is connected directly to the first counterplate. The torsional vibration damper can contact the counterplate, for example directly, and can be connected to the first counterplate, for example by means of a threaded or riveted connection. This thereby avoids any additional components between the torsional vibration damper and the first counterplate, resulting in a simple and construction-space-saving structure.

Preferably, the torsional vibration damper is connected to the input shaft by means of an intermediate element opposing the input shaft radially, in particular a flexible disk. The torsional vibration damper can be connected to the intermediate element in particular directly, for example by means of a threaded or riveted connection. To this end, the torsional vibration damper can directly contact the intermediate element. The intermediate element is connected to the input shaft in particular directly, in particular by means of a flange connection. The intermediate element can directly contact the input shaft. By means of the intermediate element, the rotational vibration damper can be attached radially on the outside, resulting in a correspondingly simple construction for the torsional vibration damper.

By particular preference, the first counterplate has a first clutch surface facing the first clutch disk, the torsional vibration damper being spaced apart from the first clutch surface axially in the direction of the engine. The torsional vibration damper can be offset in comparison to the first clutch surface in the direction of the input shaft. As a result, the torsional vibration damper does not project so severely into the intermediate space provided between friction lining and output shafts, rendering unnecessary a complicated geometry that is contorted in the axial direction for the clutch disks and/or provided actuating pots. This significantly simplifies the construction of the dual clutch.

The invention also relates to a gear train for a motor vehicle having an input shaft on the engine side, a first output shaft on the transmission side, a second output shaft on the transmission side and a dual clutch for coupling the input shaft with the first output shaft and/or the second output shaft, where the dual clutch can be configured and refined as described above. At the same time the torsional vibration damper may be attached at significantly different diameters, so that the dual mass flywheel does not project into the construction space between the output shafts and the pressure plates, which simplifies the construction without significantly increasing the construction space. The gear train may have in particular at least one vibration damper that is connected directly or indirectly to the dual clutch, in particular a dual mass flywheel and/or centrifugal force pendulum and/or mass pendulum, where the vibration damper may be located before or after the dual clutch in the flux of force direction.

The object of the invention is to create a dual clutch that makes a simplified construction possible without increasing the construction space significantly.

BRIEF DESCRIPTION OF THE DRAWINGS

Examples of the invention will be explained below, referring to the accompanying drawings, on the basis of preferred exemplary embodiments. The figures show the following.

DETAILED DESCRIPTION OF THE INVENTION

Figure 1:
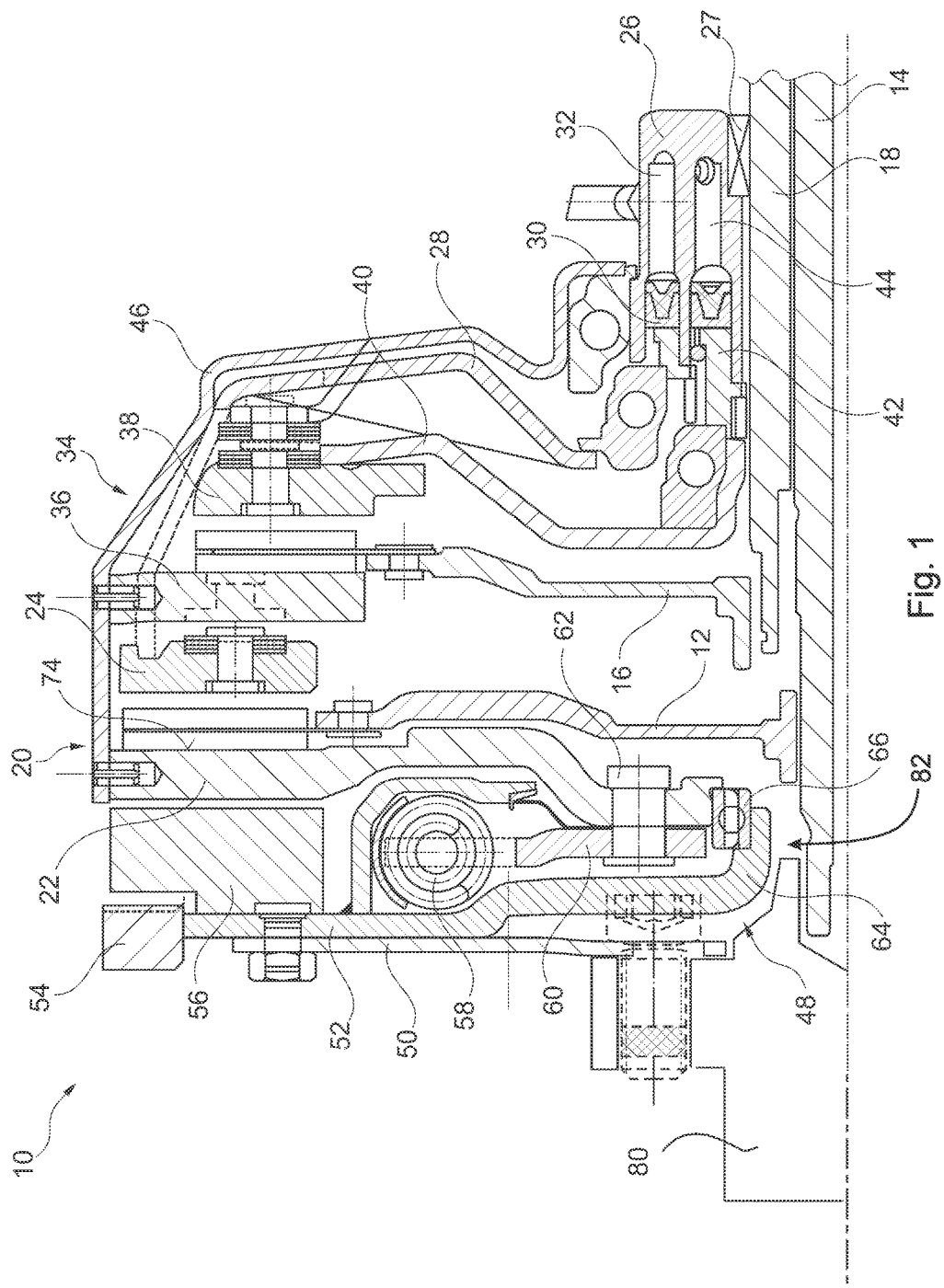
FIG. 1 is a schematic sectional view of a first embodiment of a dual clutch; and, FIG. 2 is a schematic sectional view of a second embodiment of a dual clutch.

Dual clutch 10 depicted in FIG. 1 is connected via clutch disk 12 to output shaft 14, and via clutch disk 16 to output shaft 18 which is situated coaxially to output shaft 14. Clutch disk 12 and clutch disk 16 are connected, for example, via gearing to respective output shaft 14, 18 in a rotationally fixed but axially movable connection. Clutch disk 12 is part of clutch 20, which has pressure plate 24 that is axially movable relative to counterplate 22. Clutch disk 12 extends to a point between the first pressure plate 24 and counterplate 22. Pressure plate 24 can be moved axially by actuating mechanism 26, which is braced radially against the coaxially outer output shaft 18 by means of bearing 27. To this end, pressure plate 24 is connected through actuating pot 28 to piston 30 of actuating mechanism 26. Piston 30 can be subjected to a pressure by means of annular pressure cylinder 32, in order to engage clutch 20. Correspondingly, clutch disk 16 is part of clutch 34, which has pressure plate 38 that is movable axially relative to counterplate 36. Pressure plate 38 is connected through actuating pot 40 to piston 42 of actuating mechanism 26. Piston 42 can be moved out with the aid of annular pressure cylinder 44, which is situated coaxially radially inside of pressure cylinder 32, in order to engage clutch 34. Counterplate 22 and counterplate 36 are firmly connected to clutch cover 46.

Interposed between input shaft 80 and counterplate 22 in the flux of force direction is a torsional vibration damper, which is designed in the exemplary embodiment depicted in FIG. 1 as dual mass flywheel 48. Dual mass flywheel 48 is connected through flexible disk 50 to input shaft 80. Dual mass flywheel 48 has input flange 52, which is directly connected to flexible disk 50. In the depicted exemplary embodiment, starter crown 54 and mass ring 56 are connected to input flange 52. The mass inertia of the input side of dual mass flywheel 48 can be influenced by mass ring 56.

Input flange 52 is connected via bow spring 58 running in the circumferential direction to output flange 60. Output flange 60 is connected directly via riveted connection 62 to counterplate 22. To this end, counterplate 22 extends an appropriate distance radially toward the inside. Input flange 52 also has extension 64 spaced in the axial direction, against which counterplate 22 is braced via fixed bearing 66. Radial gap 82 is disposed between output shaft 14 and extension 64 of input flange 52. In other words, radial gap 82 is disposed radially outward of output shaft 14 and radially inward of extension 64, output flange 60 and counterplate 22. Counterplate 22 has clutch surface facing 74 clutch disk 12, dual mass flywheel 48 being spaced apart axially from clutch surface 74 in the direction of the engine, so that dual mass flywheel 48 does not project into the area between pressure plates 24, 38 and output shafts 14, 18. However, it is not absolutely required to be designed so that an interval is preserved at that location in order to not influence the plate.

Figure 2:
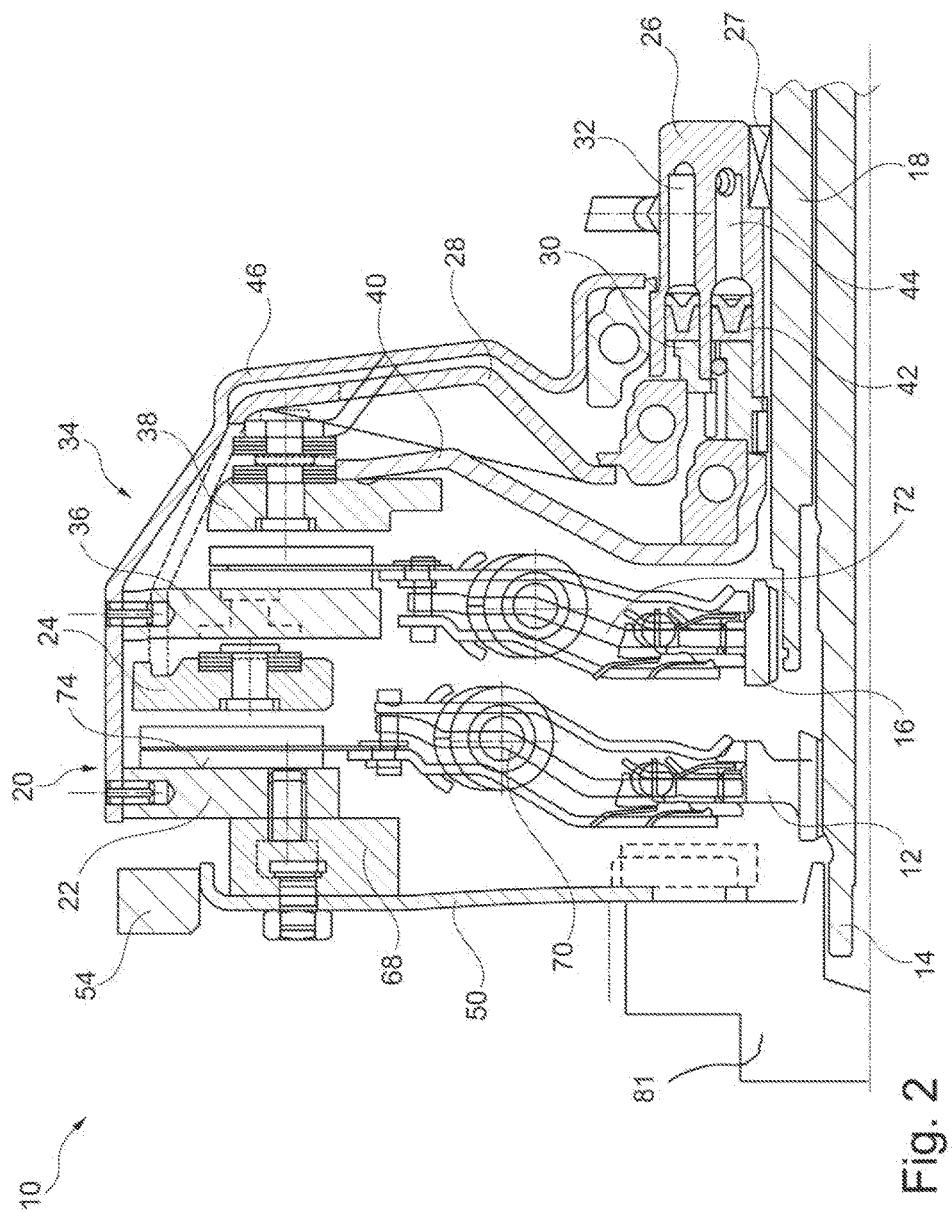

In the embodiment of dual clutch 10 depicted in FIG. 2, in comparison to the dual clutch depicted in FIG. 1, dual mass flywheel 48 is replaced by centrifugal force pendulum 68. Centrifugal force pendulum 68 is interposed between input shaft 81 and counterplate 22. The torsional vibration damper designed as centrifugal force pendulum 68 is situated comparatively far outside radially, so that centrifugal force pendulum 68 does not project into the area between counterplate 22, 36 and output shaft 14, 18. This makes it possible to provide clutch disk 12 with plate damper 70 and clutch disk 16 with plate damper 72. Because of flexible disk 50, centrifugal force pendulum 68 and plate dampers 70, 72 of clutches 20, 34, different torsional vibration frequencies can be canceled or dampened.

In the dual clutch aggregate described above, in particular for use in connection with power-shift transmissions (parallel shift transmissions), the engaging force for the clutches is introduced directly into the clutches, preferably without mechanical leverage, where the pressure pots can be formed as intermediate elements between pressure plates and actuators, essentially rigidly or with a defined elasticity.

REFERENCE NUMERALS

10 Dual clutch
12 Clutch disk
14 Output shaft
16 Clutch disk
18 Output shaft
20 Clutch
22 Counterplate
24 Pressure plate
26 Actuating device
28 Actuating pot
30 Piston
32 Pressure cylinder
34 Clutch
36 Counterplate
38 Pressure plate
40 Actuating pot
42 Piston
44 Pressure cylinder
46 Clutch cover
48 Dual mass flywheel
50 Flexible disk
52 Input flange
54 Starter crown
56 Mass ring 58 Bow spring
60 Output flange
62 Riveted connection
64 Extension
66 Bearing
68 Centrifugal force pendulum
70 Plate damper
72 Plate damper
74 Clutch surface
80 Input shaft
81 Input shaft
82 Radial gap

What is claimed is:

1. A dual clutch for coupling an input shaft on an engine side with a first output shaft on a transmission side and/or a second output shaft on the transmission side, comprising:
a first clutch, which has a first pressure plate that is axially movable relative to a first counterplate for coupling a first clutch disk that is connected to the first output shaft, the first counterplate including a first radially outward facing surface connected to a clutch cover, the clutch cover being a separate member from the first counterplate;
a second clutch, which has a second pressure plate that is axially movable relative to a second counterplate for coupling a second clutch disk that is connected to the second output shaft, the second counterplate including a second radially outward facing surface connected to the clutch cover; and,
a dual mass flywheel situated in a direction of flux of force between the input shaft and the first counterplate, the dual mass flywheel having:
an input flange non-rotatably connected to the input shaft, the input flange having an extension;
an output flange non-rotatably connected to the first counterplate; and,
a bow spring engaged with the input flange and the output flange and running in the circumferential direction to transmit torque, the bow spring arranged radially outward of the extension of the input flange;
a radial gap arranged:
radially outward of the first output shaft; and,
radially inward of the extension of the input flange, the output flange, and the first counterplate, wherein:
the input flange is arranged to receive the flux of force at a point at which the input flange is bolted to a flexible disk non-rotatably connected to the input shaft, the point on the input flange being radially outward from the bow spring; and,
the flux of force is introducible from the input shaft into the dual mass flywheel via the point at which the input flange is bolted to the flexible disk which is radially outside of the bow spring, the flux of force is dispersible from the dual mass flywheel to the first counterplate radially inside of the bow spring, and the flux of force is dispersible from the first counterplate to the clutch cover, and from the clutch cover to the second counterplate.

2. The dual clutch recited in claim 1, wherein the first counterplate is supported on the input flange.

3. The dual clutch recited in claim 1, wherein an actuating mechanism is provided for moving the first pressure plate and/or the second pressure plate axially, the first pressure plate and/or the second pressure plate being coupled to the actuating mechanism essentially without a gear ratio change.

4. The dual clutch recited in claim 3, wherein the first pressure plate is connected to the actuating mechanism by means of a first actuating pot, and/or the second pressure plate is connected to the actuating mechanism by means of a second actuating pot, the first actuating pot and the second actuating pot being movable only axially.

5. The dual clutch recited in claim 3, wherein the actuating mechanism has a first annular pressure cylinder to move the first pressure plate and a second annular pressure cylinder to move the second pressure plate, the first pressure cylinder and the second pressure cylinder being situated coaxially with respect to each other.

6. The dual clutch recited in claim 3, wherein the first pressure plate is connected to the actuating mechanism by a single rigid plate, and/or the second pressure plate is connected to the actuating mechanism by a single rigid plate.

7. The dual clutch recited in claim 1, wherein the dual mass flywheel is connected directly to the first counterplate.

8. The dual clutch recited in claim 1, wherein the dual mass flywheel is connected to the input shaft by means of the flexible disk opposing the input shaft radially.

9. The dual clutch recited in claim 1, wherein the first counterplate has a first clutch surface facing the first clutch disk, the dual mass flywheel being spaced apart from the first clutch surface axially in the direction of the engine.

10. A gear train for a motor vehicle having an input shaft on an engine side, a first output shaft on an transmission side, a second output shaft on the transmission side and a dual clutch on the transmission side, comprising:
a first clutch, which has a first pressure plate that is axially movable relative to a first counterplate for coupling a first clutch disk that is connected to the first output shaft, the first counterplate including a first radially outward facing surface connected to a clutch cover, the clutch cover being a separate member from the first counterplate;
a second clutch, which has a second pressure plate that is axially movable relative to a second counterplate for coupling a second clutch disk that is connected to the second output shaft, the second counterplate including a second radially outward facing surface connected to the clutch cover;
a dual mass flywheel situated in the direction of flux of force between the input shaft and the first counterplate, dual mass flywheel includes:
an input flange non-rotatably connected to the input shaft, the input flange having an extension;
an output flange non-rotatably connected to the first counterplate; and,
a bow spring engaged with the input flange and the output flange and running in the circumferential direction to transmit torque, the bow spring arranged radially outward of the extension of the input flange; and,
a radial gap arranged:
radially outward of the first output shaft; and,
radially inward of the extension of the input flange, the output flange, and the first counterplate, wherein:
the first and second clutches are separated from the bow spring in a first direction parallel to an axis of direction for the first and second clutch;
the input flange is arranged to receive the flux of force at a point on the input flange located further in a second direction, opposite the first direction, than the bow spring;
the point on the input flange is a point at which the input flange is bolted to a flexible disk that is non-rotatably connected to the input shaft;

the flux of force is introducible into the dual mass flywheel at the point at which the input flange is bolted to the flexible disk which is radially outside of the bow spring, the flux of force is dispersible from the dual mass flywheel to the first counterplate radially inside of the bow spring, and the flux of force is dispersible from the first counterplate to the clutch cover, and from the clutch cover to the second counterplate; and, said dual clutch is operatively arranged to couple the input shaft to the first output shaft and/or the second output shaft.

11. The dual clutch recited in claim 1, wherein the first counterplate is braced and supported on the extension by means of a fixed bearing.

12. A dual clutch for coupling an input shaft on an engine side with a first output shaft on a transmission side and/or a second output shaft on the transmission side, comprising:

a first clutch, which has a first pressure plate that is axially movable relative to a first counterplate for coupling a first clutch disk that is connected to the first output shaft, the first counterplate including a first radially outward facing surface connected to a clutch cover, the clutch cover being a separate member from the first counterplate;

a second clutch, which has a second pressure plate that is axially movable relative to a second counterplate for coupling a second clutch disk that is connected to the second output shaft, the second counterplate including a second radially outward facing surface connected to the clutch cover;

an actuating mechanism connected to the first pressure plate by means of a first actuating pot, and/or the second pressure plate connected to the actuating mechanism by means of a second actuating pot, the first actuating pot and the second actuating pot being movable only axially wherein:

the actuating mechanism has a first annular pressure cylinder to move the first pressure plate and a second annular pressure cylinder to move the second pressure plate, the first pressure cylinder and the second pressure cylinder being situated coaxially with respect to each other; and, a dual mass flywheel situated in a direction of flux of force between the input shaft and the first counterplate, the dual mass flywheel having:

an input flange non-rotatably connected to the input shaft, the input flange having an extension;

a mass ring non-rotatably connected to the input flange, the mass ring axially arranged between the input flange and the first counterplate;

an output flange non-rotatably connected to the first counterplate; and, a bow spring engaged with the input flange and the output flange and running in the circumferential direction to transmit torque, the bow spring arranged radially outward of the extension of the input flange; and, a radial gap arranged:

radially outward of the first output shaft; and, radially inward of the extension of the input flange, the output flange, and the first counterplate, wherein:

the input flange is arranged to receive the flux of force at a point at which the input flange is bolted to a flexible disk non-rotatably connected to the input shaft, the point on the input flange being radially outward from the bow spring; and, the flux of force is introducible from the input shaft into the dual mass flywheel via the point at which the input flange is bolted to the flexible disk which is radially outside of the bow spring and the flux of force is dispersible from the dual mass flywheel to the first counterplate radially inside of the bow spring, and the flux of force is dispersible from the first counterplate to the clutch cover, and from the clutch cover to the second counterplate.

* * * * *